United States Patent
Hizuka et al.

(10) Patent No.: US 7,092,104 B2
(45) Date of Patent: Aug. 15, 2006

(54) SPECKLE INTERFEROMETER APPARATUS

(75) Inventors: Masatoshi Hizuka, Saitama (JP); Hideo Kanda, Saitama (JP); Takayuki Saito, Saitama (JP)

(73) Assignee: Fujinon Corporation, Saitama (JP)

( * ) Notice: Subject to any disclaimer, the term of this patent is extended or adjusted under 35 U.S.C. 154(b) by 267 days.

(21) Appl. No.: 10/779,599

(22) Filed: Feb. 18, 2004

(65) Prior Publication Data
US 2004/0179204 A1    Sep. 16, 2004

(30) Foreign Application Priority Data
Mar. 10, 2003   (JP) ............... 2003-063709

(51) Int. Cl.
*G01B 11/02* (2006.01)

(52) U.S. Cl. .................................. 356/512
(58) Field of Classification Search ............... 356/511, 356/512, 513, 514
See application file for complete search history.

(56) References Cited

U.S. PATENT DOCUMENTS

| | | | | |
|---|---|---|---|---|
| 5,231,468 A | * | 7/1993 | Deason et al. ............. | 356/513 |
| 6,097,477 A | * | 8/2000 | Sarrafzadeh-Khoee ..... | 356/35.5 |
| 6,188,482 B1 | * | 2/2001 | Cloud ...................... | 356/491 |
| 6,417,916 B1 | * | 7/2002 | Dengler et al. ........... | 356/35.5 |

FOREIGN PATENT DOCUMENTS

JP    2001-311613    11/2001

* cited by examiner

*Primary Examiner*—Hoa Q. Pham
*Assistant Examiner*—Michael A. Lyons
(74) *Attorney, Agent, or Firm*—Snider & Associates; Ronald R. Snider

(57) ABSTRACT

In a speckle interferometer apparatus 2, an optical member mounting device 10 mounted with optical members including a pair of luminous flux outputting devices 9a, 9b, 9c, 9d is disposed on the object side of a main unit of an imaging device 3 while being separated from the imaging device 3. A light-transmitting area 14 is formed between the pair of luminous flux outputting devices 9a, 9b, 9c, 9d so as to transmit therethrough interference light from an object surface.

10 Claims, 8 Drawing Sheets

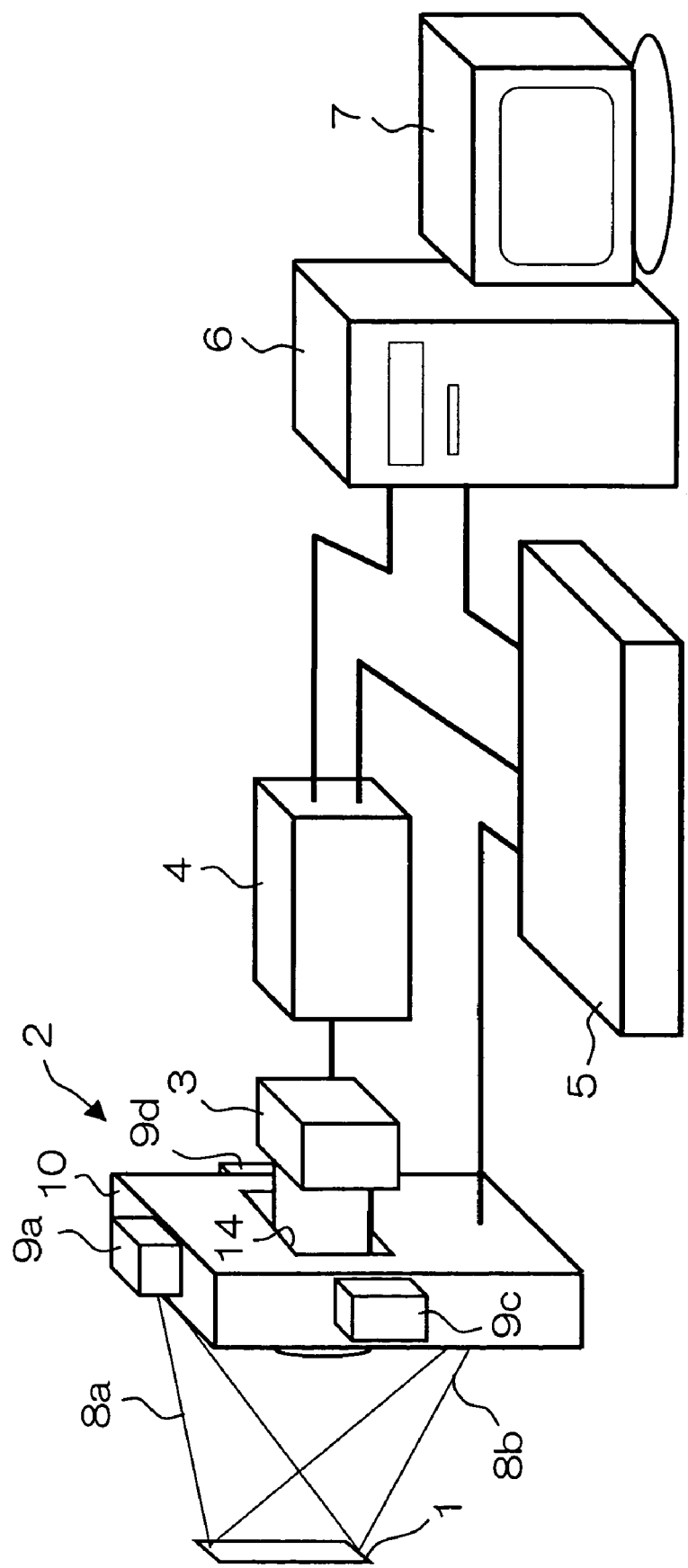

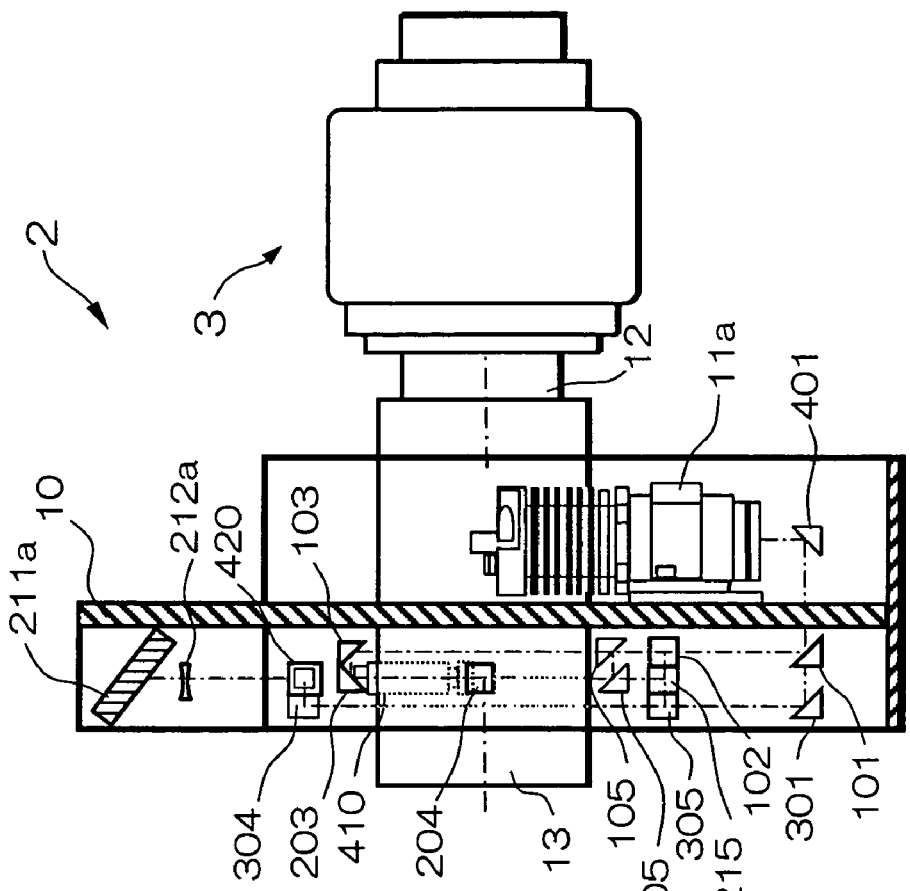
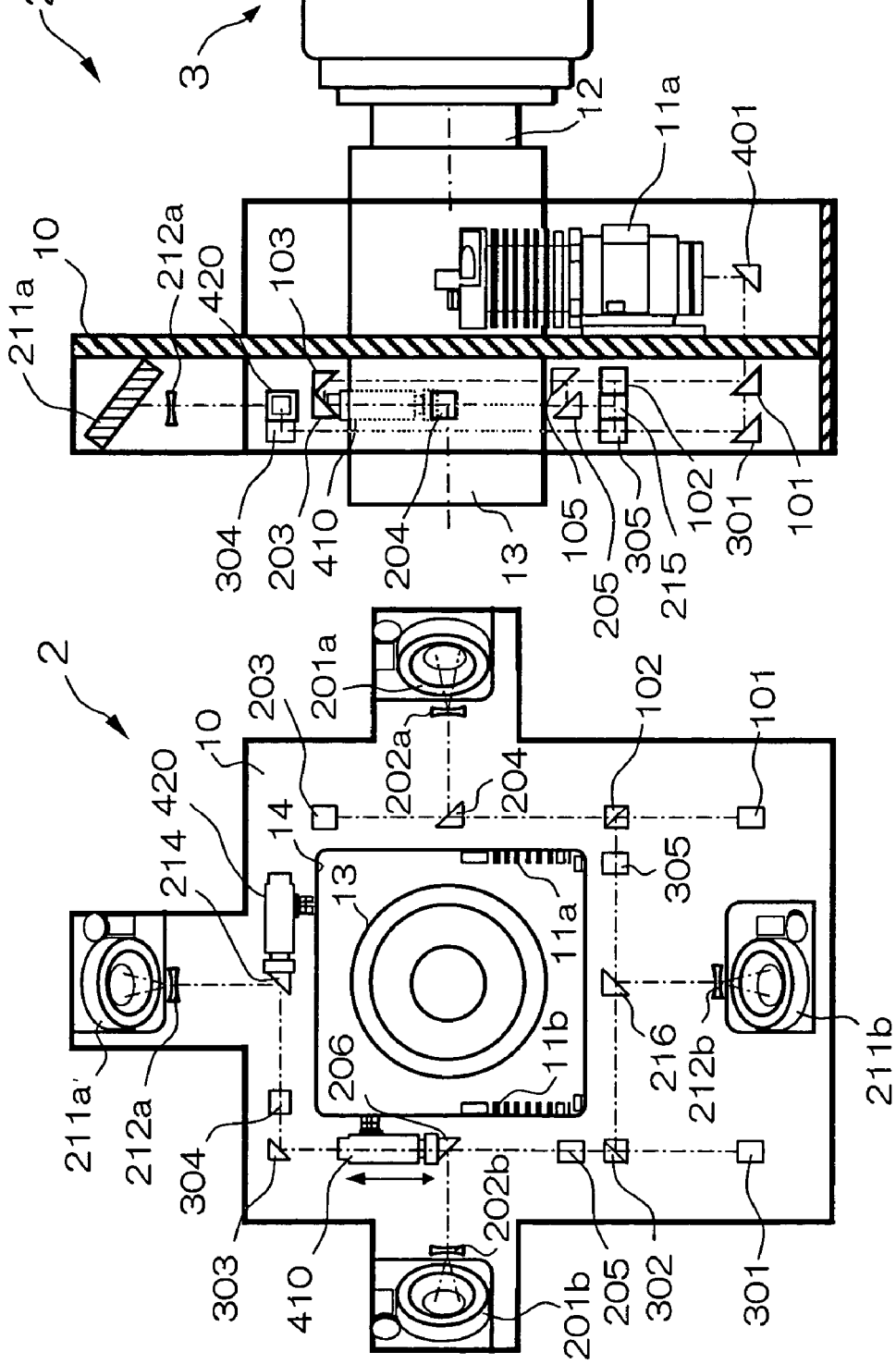

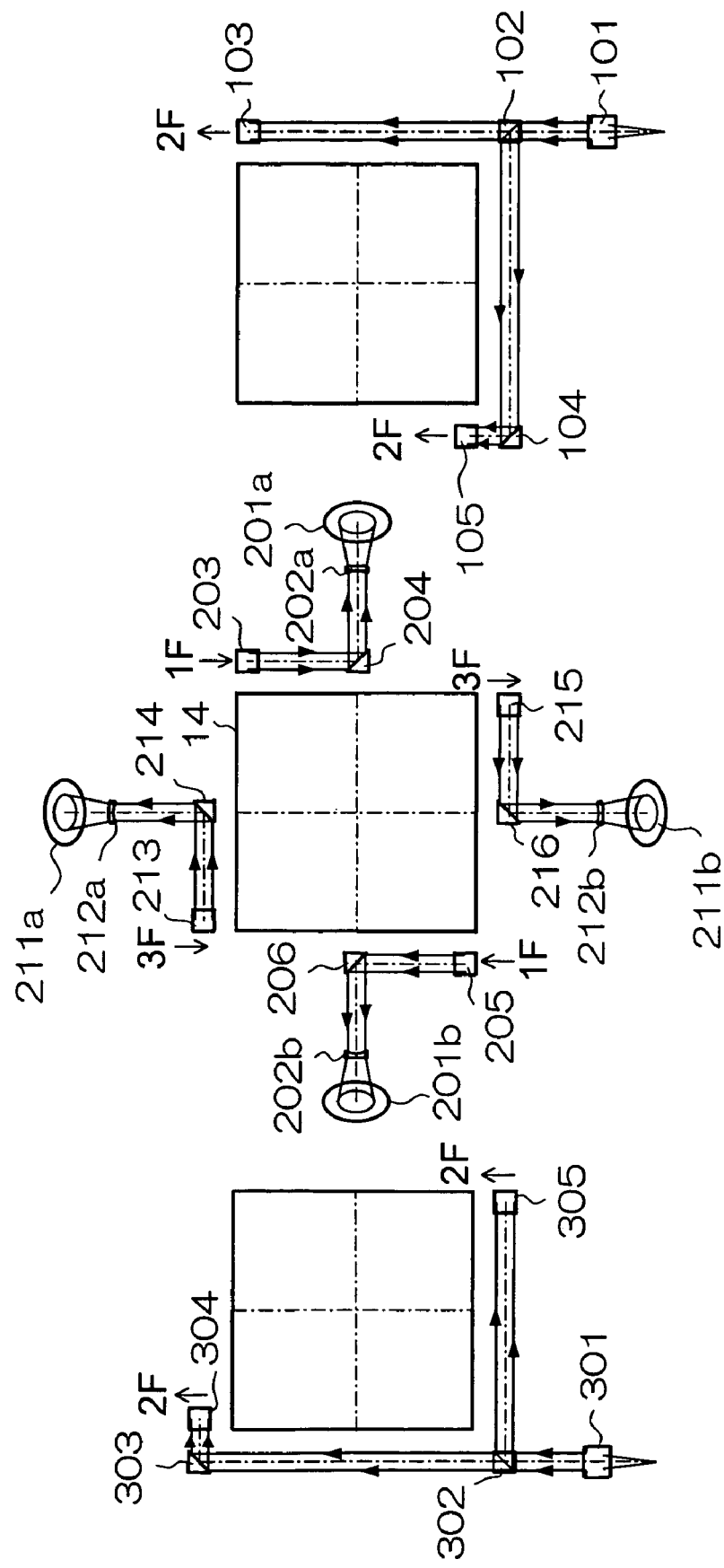

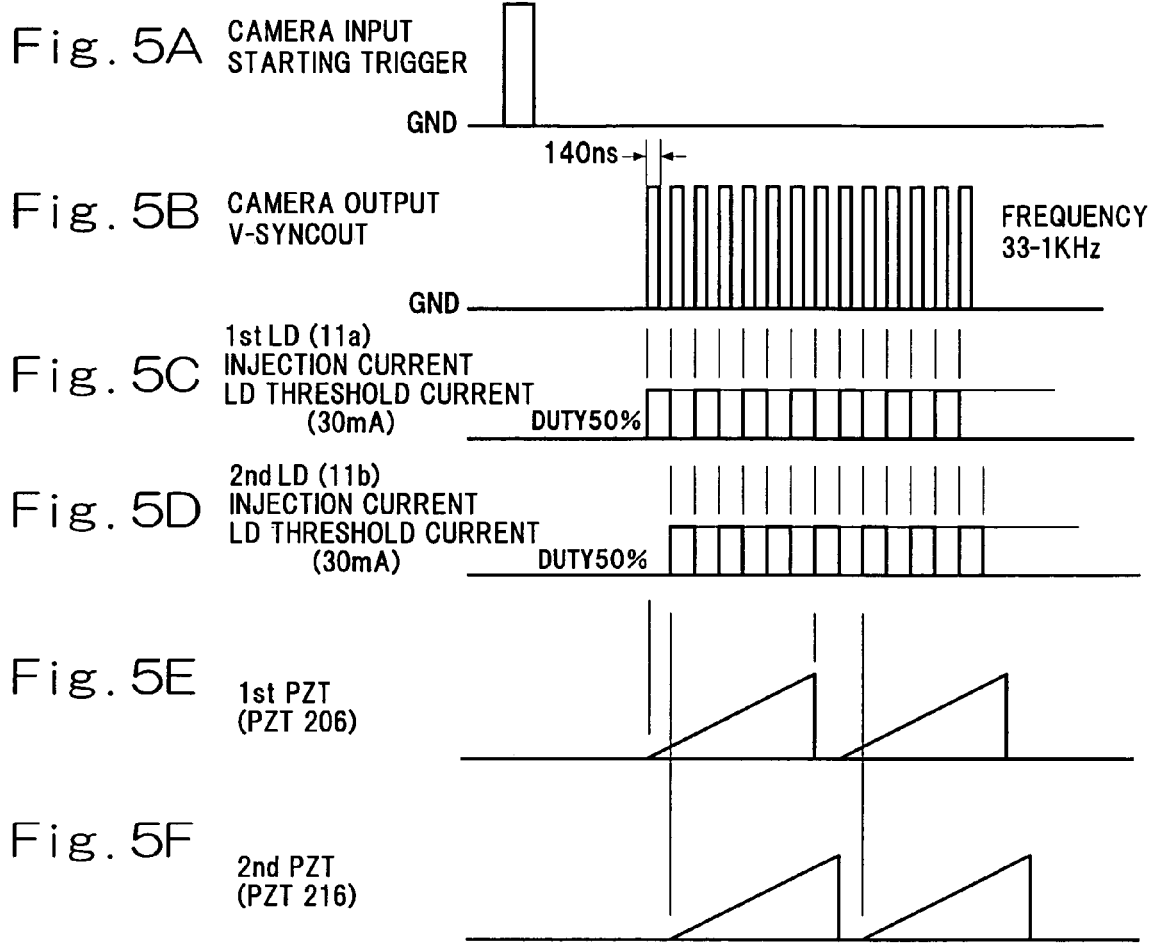

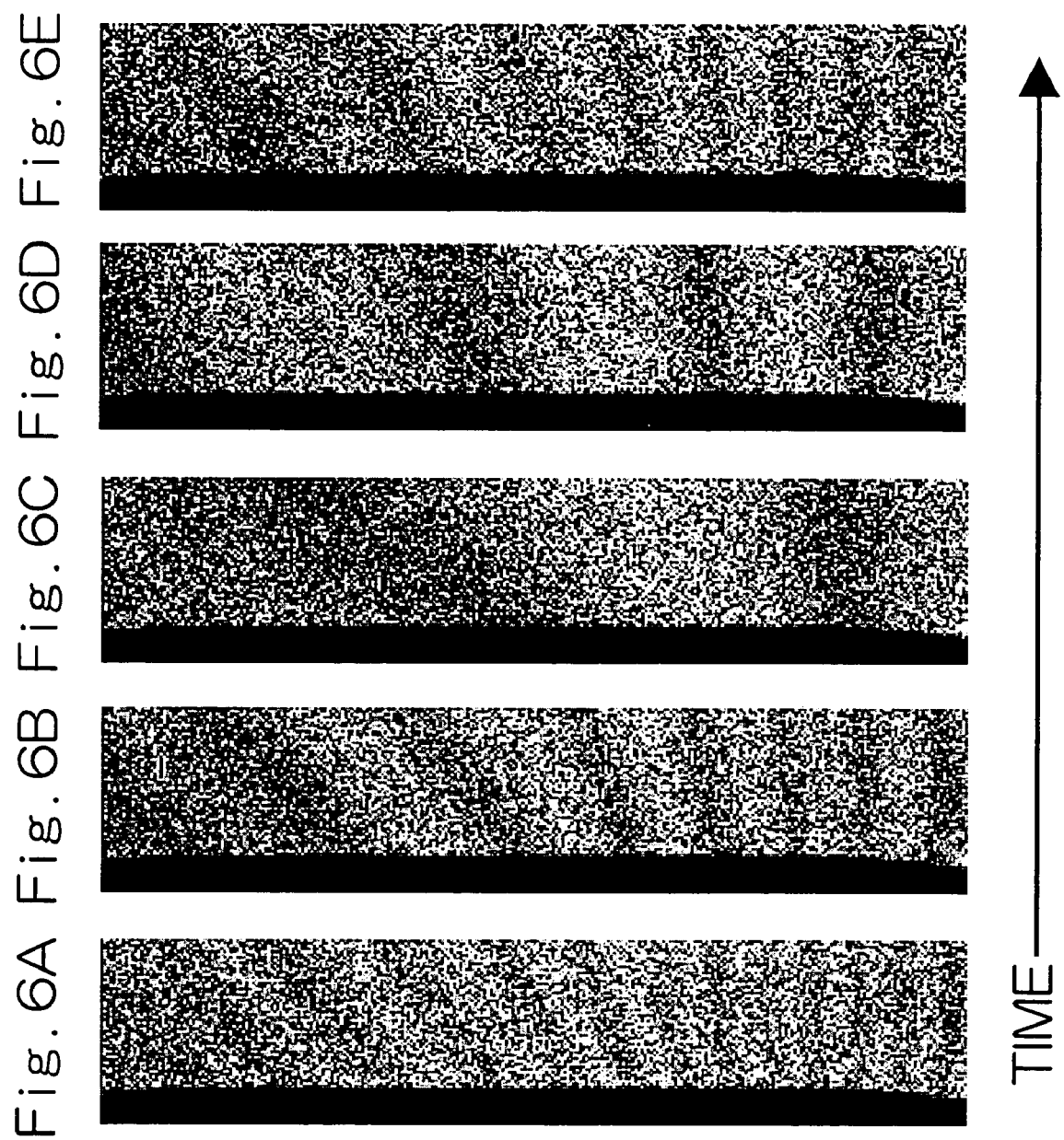

SPECKLE INTERFEROMETER APPARATUS

RELATED APPLICATIONS

This application claims the priority of Japanese Patent Application No. 2003-063709 filed on Mar. 10, 2003, which is incorporated herein by reference.

BACKGROUND OF THE INVENTION

1. Field of the Invention

The present invention relates to a speckle interferometer apparatus for measuring deformations by using electronic speckle interferometry. In particular, the present invention relates to a speckle interferometer apparatus which takes account of convenience of exchanging image pickup cameras and the like when capturing interference speckle pattern images concerning temporal deformations (in-plane deformations in particular) of dynamic objects.

2. Description of the Prior Art

Conventionally, deformation measuring methods using electric strain gauges have widely been used for observing processes in which objects bearing a load deform and collapse. Known on the other hand is speckle interferometry which can carry out highly accurate deformation measurement with reference to wavelengths of light in a two-dimensional field of view with respect to deformations of an object.

The speckle interferometry is interferometry utilizing speckle-like patterns (speckle patterns) occurring in an observation surface when a rough object is irradiated with laser light. Speckle patterns are considered as image noises which are unfavorable in typical image-forming systems. However, they carry surface information of the rough object, whereby deformations can be estimated from changes in the speckle patterns. It is also advantageous in that the surface of the rough object can be observed without any particular preprocessing, thus requiring no photoplate with a high resolution or the like which is necessary for holography.

With reference to FIG. 8, a conventional speckle interferometer apparatus 502 of dual luminous flux irradiation type will be explained. An object 501 to be observed, which is a rough object, is irradiated with a laser luminous flux from a laser light source 701 (only the luminous flux exit position thereof being depicted) disposed substantially symmetrical to the object 501 within an xz plane (plane parallel to the paper surface). The laser luminous flux outputted from the laser light source 701 reaches a beam splitter 705$b$ by way of a collimator 612 and a reflecting mirror 705$a$. One of the laser luminous fluxes divided by the beam splitter 705$b$ travels reflecting mirrors 705$c$, 705$d$ and a concave lens 602$a$, and is reflected by a reflecting mirror 601$a$ so as to illuminate the object 501. The other travels reflecting mirrors 705$e$, 705$f$, 705$g$ and a concave lens 602$b$, and is reflected by a reflecting mirror 601$b$ so as to illuminate the object 501. The two luminous fluxes are configured so as to yield a predetermined optical path length difference for convenience of phase analysis processing of interference speckle pattern images. The two luminous fluxes thus illuminating the object 501 are divergently reflected thereby, so as to form an interference speckle pattern on an image-forming surface of a CCD camera 503. Thereafter, thus obtained interference speckle pattern image is analyzed, so as to carry out a phase analysis in conformity to the surface form of the object 501.

Known in the phase analysis of interference speckle pattern images is a technique in which interference speckle patterns of the object 501 before and after a deformation are captured, and the difference in intensity is calculated for each image point.

Two shutters are placed on respective optical paths of the divided luminous fluxes, and intensity distributions $I_1(x; t)$, $I_2(x; t)$ for the individual image points in a time domain obtained when the object is irradiated with one luminous flux alone are measured before the phase analysis.

In general, an interference pattern $I(x; t)$ obtained in an optical system of a speckle interferometer apparatus is represented by the following expression (1):

$$I(x;t) = I_0(x;t)[1+\gamma(x;t)\cos(\theta(x;t)+\phi(x;t))] \quad (1)$$

where $I_0(x; t)$ is the average intensity of $I_1(x; t)$ and $I_2(x; t)$, $\theta(x; t)$ is a random speckle phase, $\gamma(x; t)$ is the degree of modulation, and $\phi(x; t)$ is the object phase.

In the conventional speckle interferometer apparatus such as the one mentioned above, two irradiation optical systems for irradiating the object 501 with luminous fluxes from the laser light source 701 and the CCD camera 503 for capturing an image of interference speckle patterns are accommodated together in the apparatus.

For measuring dynamic interference speckle patterns, there has been a demand for exchanging the CCD camera 503 between a normal CCD camera and a high-speed camera or among various high-speed cameras according to the rate of deformation of the object 501 or the like. In such a case, the housing of the apparatus and its inner mechanical parts must be disassembled for exchanging the cameras in the above-mentioned apparatus.

SUMMARY OF THE INVENTION

In view of the foregoing circumstances, it is an object of the present invention to provide a compact speckle interferometer apparatus which allows image pickup cameras and the like to be exchanged easily while attaining a favorable measurement accuracy.

The present invention provides a speckle interferometer apparatus for dividing a luminous flux from a light source into two luminous fluxes, irradiating a rough object surface acting as a surface to be measured with the two luminous fluxes, causing respective reflected luminous fluxes of the two luminous fluxes from the rough object surface to interfere with each other, and capturing an image of an interference speckle pattern formed by the interference;

the apparatus comprising:

a luminous flux dividing device which divides the luminous flux from the light source into the two luminous fluxes;

two luminous flux outputting devices which outputs the respective divided luminous fluxes toward the rough object surface; and an optical member mounting device, disposed on the rough object surface side of a main unit of an imaging device which captures the image of the interference speckle pattern while being separated from the imaging device, which mounts the luminous flux dividing device and luminous flux outputting devices;

wherein a predetermined area of the optical member mounting device located between the two luminous flux outputting devices is a light-transmitting area which transmits therethrough interference light from the rough object surface.

Here, it will be sufficient if the optical member mounting device is disposed on the rough object surface side of the main unit of the imaging device. For example, a lens barrel of the imaging device may be located on the rough object surface side of the optical member mounting device.

Preferably, the optical member mounting device is mounted with an optical path length difference providing device which provides a predetermined optical path length difference between optical paths of the two luminous fluxes divided by the luminous flux dividing device.

Preferably, the optical member mounting device is formed like a plate.

Preferably, the two luminous flux outputting devices are substantially disposed so as to oppose each other across the light-transmitting area in a predetermined direction.

Preferably, the apparatus comprises two sets each of the two luminous flux outputting devices, the respective predetermined directions of the two luminous flux outputting devices in the two sets being substantially orthogonal to each other.

The light-transmitting area may be a through hole formed in the optical member mounting device.

The two sets of the two luminous flux outputting devices can be regulated such that one group can output the luminous flux alone or such that the two sets can alternately output the luminous fluxes.

The light-transmitting area may be a transparent plate constituting at least a part of the optical member mounting device.

Preferably, an optical member mounted on the optical member mounting device has a layered structure near the light-transmitting area.

The layered structure may comprise three floors.

BRIEF DESCRIPTION OF THE DRAWINGS

FIG. 1 is a schematic view showing the configuration of the speckle interferometer apparatus in accordance with an embodiment of the present invention;

FIGS. 2A and 2B are front and side views showing a main part of the apparatus in accordance with the embodiment of the present invention in detail, respectively;

FIGS. 4A, 4B, and 4C are views showing third, second, and first floors of optical members in the apparatus in accordance with the embodiment of the present invention, respectively;

FIGS. 5A to 5F are timing charts showing timings for driving individual light sources in the apparatus in accordance with the embodiment of the present invention;

FIGS. 6A to 6E are views showing changes in an interference speckle pattern image in the embodiment when a material such as an aluminum alloy is pulled;

FIG. 7A is a view showing an interference speckle pattern image, whereas

DESCRIPTION OF THE PREFERRED EMBODIMENTS

Figure 3A:
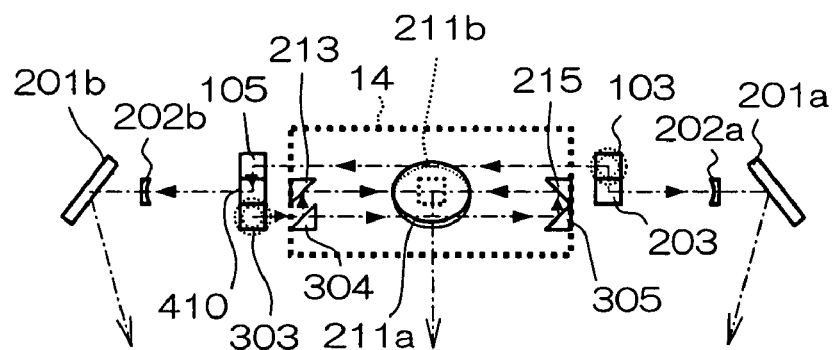
FIGS. 3A, 3B, and 3C are plan, front, and side views showing arrangements of optical members in the apparatus in accordance with the embodiment of the present invention in detail, respectively.

In the following, the speckle interferometer apparatus in accordance with an embodiment of the present invention will be explained with reference to the drawings.

Basic Configuration

FIG. 1 shows the speckle interferometer apparatus 2 in accordance with the embodiment for carrying out speckle interferometry of in-plane displacements in an object (rough object) 1 to be observed.

For obtaining a unidirectional interference speckle pattern (which is vertical in the embodiment), the object 1 is irradiated with a pair of laser luminous fluxes 8a, 8b from luminous flux outputting devices 9a, 9b (9b being undepicted) in the speckle interferometer apparatus 2 for measuring in-plane displacements shown in FIG. 1. The pair of laser luminous fluxes 8a, 8b from the luminous flux outputting devices 9a, 9b are set so as to be substantially symmetrical to each other about a normal of the object. The two laser luminous fluxes 8a, 8b illuminating the object 1 form speckle patterns independent from each other, which interfere with each other, thereby forming an image of the unidirectional interference speckle pattern on an image pickup surface of a CCD camera (high-speed camera) 3. The image of the interference speckle pattern will be photoelectrically read thereafter.

Though not depicted, the object 1 is irradiated with a pair of laser luminous fluxes from respective luminous flux outputting devices 9c, 9d in order to obtain an interference speckle pattern in a direction (horizontal direction in the embodiment) substantially orthogonal to the former direction in the speckle interferometer apparatus 2. Thereafter, as mentioned above, an image of the interference speckle pattern substantially orthogonal to the former direction is formed on the image pickup surface of the CCD camera 3, and is photoelectrically read.

The apparatus in accordance with the embodiment shown in FIG. 1 comprises a frame-like optical member mounting plate (hereinafter simply referred to as optical member mounting plate) 10 for mounting optical members such as two semiconductor laser light sources (a first light source for obtaining a vertical interference speckle pattern and a second light source for obtaining a horizontal interference speckle pattern in the embodiment), luminous flux dividing devices (beam splitters in the embodiment) for dividing each of the luminous fluxes from the light sources into two luminous fluxes, optical path length difference providing devices for providing a predetermined optical path length difference between the divided two luminous fluxes, and luminous flux outputting devices (reflecting mirrors in the embodiment) for outputting the two luminous fluxes provided with the optical path length difference toward the surface of the object 1 to be observed.

The optical member mounting plate 10 is disposed on the object 1 side of the main unit of the CCD camera 3 for capturing images of interference speckle patterns while being separated from the CCD camera 3. A light-transmitting area for transmitting therethrough interference light from the object 1 is formed at substantially the center area of the optical member mounting plate 10. In this embodiment, the light-transmitting area is a through hole 14, in which a lens barrel 13 of the CCD camera 3 is inserted.

As shown in FIG. 1, the speckle interferometer apparatus further comprises a camera power/memory device 4 equipped with a power source for driving the CCD camera 3 and a memory for storing acquired images, a controller 5, an analysis computer 6, and a monitor 7.

According to instructions from the analysis computer 6, the controller 5 regulates the driving of the light sources in the optical member mounting plate 10, mirror rotations, and the camera power/memory device 4.

The analysis computer 6 analyzes interference speckle pattern images by using phase shifting. An analyzing process performed in the analysis computer 6 will now be explained in brief.

The intensity I(x; t) of an interference speckle pattern (in the vertical or horizontal direction) detected by the CCD camera 3 is represented as in the following expression (2):

$$I_i(x;t)=I_0(x;t)[1+\gamma(x;t)\cos(\theta(x;t)+\phi(x;t)+2\pi i/N)] \quad (2)$$

where x is a coordinate, t is time, $I_0(x; t)$ is the average intensity, $\gamma(x; t)$ is the degree of modulation, $\theta(x; t)$ is a random speckle phase, $\phi(x; t)$ is the object phase accompanying a displacement of the object 1, N is the number of stages of shift during a single period, and i is a natural number not greater than N.

This embodiment aims at determining the object phase $\phi(x; t)$ at a high accuracy.

Therefore, in this embodiment, the following expressions (3) and (4) are initially determined according to the above-mentioned expression (2):

$$I_c(x;t) = \sum_{i=0}^{N-1} I_i \cos\varepsilon_i \infty \cos(\theta(x;t)+\phi(x;t)) \quad (3)$$

$$I_s(x;t) = \sum_{i=0}^{N-1} I_i \sin\varepsilon_i \infty \sin(\theta(x;t)+\phi(x;t)) \quad (4)$$

When the ratio between the cosine component $I_c(x; t)$ and sine component $I_s(x,; t)$ is determined, and the arctangent of this ratio is determined, the object phase is determined as in the following expression (5):

$$\theta(x;t)+\phi(x;t) = \tan^{-1}\left[\frac{I_s(x;t)}{I_c(x;t)}\right] \quad (5)$$

The change in the random speckle phase $\theta(x; t)$ is usually slower than that in the object phase, and thus can be approximated as in the following expression (6):

$$\theta(x;t) \cong \theta(x;0) \quad (6)$$

Therefore, the object phase is determined as in the following expression (7):

$$\phi(x;t) \cong \tan^{-1}\left[\frac{I_s(x;t)}{I_c(x;t)}\right] - \theta(x;0) \quad (7)$$

When the observation time $t_0$ ($0<t<t_0$) is so long that the above-mentioned expression (6) does not hold, the observation time $t_0$ is divided into n segments $t_d$ ($t_0=nt_d$) in which the speckle phase can be considered constant, and the object phase is determined in each segment while replacing $\theta(x; 0)$ in expression (7) with $\theta(x; kt_d)$ where k=0, 1, ..., n-1. Namely, the reference phase is updated as necessary. Finally, the segments are connected together, whereby a dynamic phenomenon over a long period of time can be analyzed. Thus determined phase curve in a time domain is in a state where the phase value is wrapped (folded) with $-\pi$ and $\pi$ acting as principal values. Therefore, thus wrapped (folded) phase curve is subjected to phase unwrapping so as to be returned to the original curve.

The foregoing arithmetic operation is carried out for each image point on the speckle interference image, whereby deformations in the observed object can be analyzed dynamically while being quantified with a high accuracy.

The phase difference between the two laser luminous fluxes 8a, 8b (the phase difference for obtaining the vertical interference speckle pattern) is set by a first PZT device (420; see FIGS. 2A and 2B) disposed on the optical member mounting plate 10. Similarly, the phase difference for obtaining the horizontal speckle pattern is set by a second PZT device (410; see FIGS. 2A and 2B) disposed on the optical member mounting plate 10.

The speckle interferometer apparatus of the present invention can employ not only the above-mentioned analyzing method, but also various known analyzing methods such as Fourier transformation and subtraction and addition method (see, for example, Japanese Unexamined Patent Publication No. 2001-31163).

The semiconductor laser light sources may be wavelength-variable laser light sources, so as to change the wavelength of the laser luminous fluxes 8a, 8b outputted from the light sources, thereby shifting the phase difference between the laser luminous fluxes 8a, 8b (on the premise that a predetermined optical path length difference is provided between the two laser luminous fluxes 8a, 8b). In this case, it is not necessary to drive the PZT devices.

For changing the wavelength of the laser luminous fluxes 8a, 8b from 660.6 nm to 661.4 nm, for example, the driving current for the semiconductor laser light sources is changed from 65 mA to 67 mA, for example. Further, each of the optical path length differences (in the vertical and horizontal directions) between the optical paths of the two systems (in the vertical and horizontal directions) from the laser light sources is set to a predetermined length (e.g., 40 mm). This can make the phase difference variable as in the case where the PZT devices are used.

Specific Apparatus Configuration

FIGS. 2A and 2B are front and side views showing the optical member mounting plate 10 of the speckle interferometer apparatus 2 in accordance with the embodiment of the present invention in detail, respectively.

In the optical member mounting plate 10, the vertical interference speckle pattern is formed by laser luminous fluxes outputted from one laser light source 11b, whereas the horizontal interference speckle pattern is formed by laser luminous fluxes outputted from the other laser light source 11a.

Namely, the vertical interference speckle pattern is formed by respective laser luminous fluxes outputted from a mirror 211a (corresponding to the luminous flux outputting device 9a in FIG. 1) and a mirror 211b (corresponding to the luminous flux outputting device 9b not depicted in FIG. 1), whereas the horizontal speckle pattern is formed by respective laser luminous fluxes outputted from a mirror 201a (corresponding to the luminous flux outputting device 9c in FIG. 1) and a mirror 201b (corresponding to the luminous flux outputting device 9d in FIG. 1).

The rectangular through hole 14 is formed in the center area of the optical member mounting plate 10. By way of the through hole 14, the CCD camera 3 captures images of the interference speckle patterns (in the vertical and horizontal directions). Though a leading end part of the image pickup lens barrel 13 of the CCD camera 3 (connected to the main unit of the camera by an adapter 12) projects on the object 1 side of the through hole 14 in FIGS. 2A and 2B, the leading end of the image pickup lens barrel 13 of the CCD camera 3 may be positioned in front of the through hole 14.

When the optical member mounting plate 10 is disposed on the front side of the main unit of the CCD camera 3, and images of interference speckle patterns are captured by way of the through hole 14 provided in the center area of the optical member mounting plate 10, the optical member mounting plate 10 can be made compact (the distance between the two mirrors 211a, 211b and the distance between the two mirrors 201a, 201b can be shortened since no obstacles exist on the light exit side) while minimizing the traveling of optical paths.

As shown in FIGS. 2A and 2B, the laser luminous fluxes outputted from the semiconductor laser light sources 11a, 11b disposed on the main unit side of the CCD camera 3 in the optical member mounting plate 10 are taken out on the object 1 side of the optical member mounting plate 10 by the reflecting mirror 401 and the like, travel about the through hole 14, and are finally outputted from the reflecting mirrors 201a, 201b, 211a, 211b. For making the optical member mounting plate 10 compact, optical members are disposed in a layered structure (three-floor structure). In order for the luminous fluxes from the two semiconductor laser light sources 11a, 11b to be discriminated from each other clearly, the first and second floors of the layered structure (the first, second, and third floors being located successively from the optical member mounting plate 10 side) are provided with optical members for guiding the laser luminous flux from the laser light source 11a to the right and left reflecting mirrors 201a, 201b, whereas the third and second floors are provided with optical members for guiding the laser luminous flux from the laser light source 11b to the upper and lower reflecting mirrors 211a, 211b. FIG. 2B omits the reflecting mirror 211b.

Figure 3B:
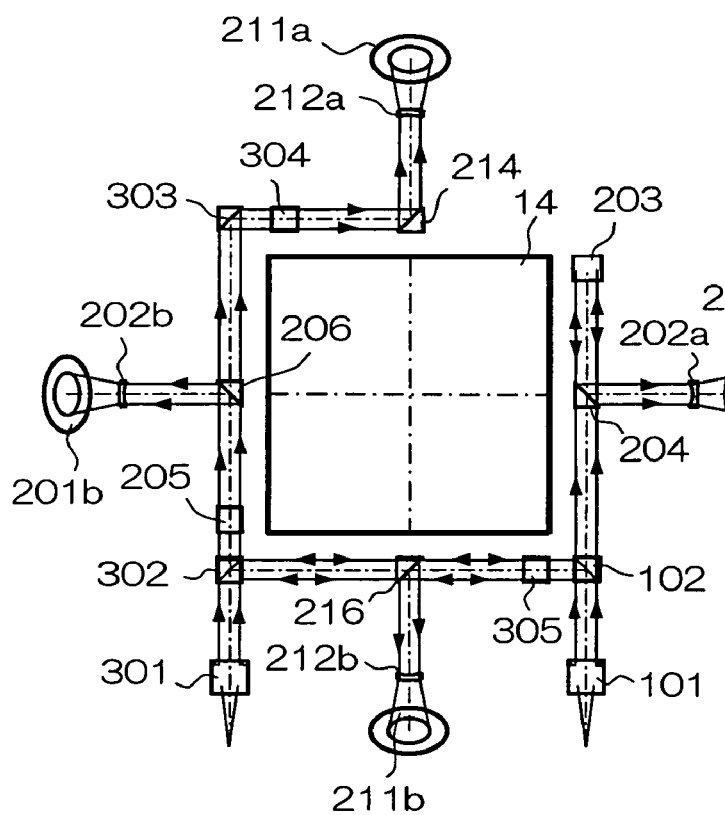
Figure 3C:
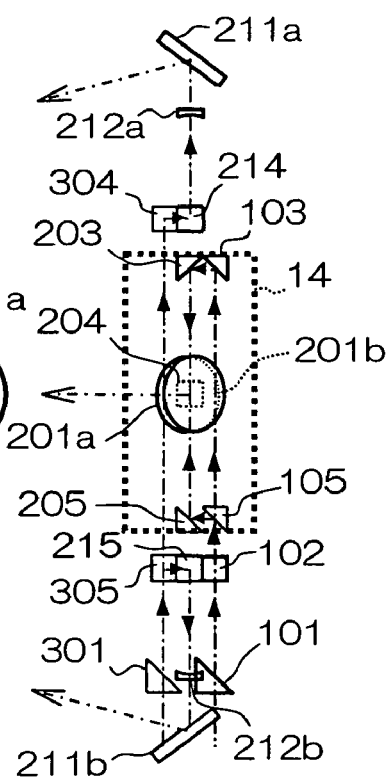

FIGS. 3A, 3B, and 3C are plan, front, and side views showing arrangements of the optical members in the layered structure, respectively. FIGS. 4A, 4B, and 4C show the third, second, and first floors of the layered structure, respectively.

The numerals on the order of 100, 200, and 300 roughly refer to the optical members disposed on the first, second, and third floors, respectively, in FIGS. 2A to 4C.

Paths from the semiconductor laser light sources 11a, 11b to the reflecting mirrors 201a, 201b, 211a, 211b will now be explained.

First, the laser luminous flux outputted from the semiconductor laser light source 11a so as to reach the reflecting mirror 201a will be explained. This laser luminous flux is fed onto the first floor of the layered structure, and travels a reflecting prism 101, a beam splitter 102, and a reflecting prism 103, so as to reach a reflecting prism 203 on the second floor of the layered structure. Thereafter, on the second floor of the layered structure, the luminous flux reaches the reflecting mirror 201a by way of a reflecting prism 204 and a concave lens 202a (see Table 1(A)).

The laser luminous flux outputted from the semiconductor laser light source 11a so as to reach the reflecting mirror 201b will now be explained. This laser luminous flux is fed onto the first floor of the layered structure, reaches the beam splitter 102 by way of the reflecting prism 101, and then is reflected by the beam splitter 102. Thus reflected laser luminous flux reaches a reflecting prism 205 on the second floor of the layered structure by way of reflecting prisms 104, 105. Thereafter, on the second floor of the layered structure, the luminous flux reaches the reflecting mirror 201b by way of a reflecting prism 206 and a concave lens 202b (see Table 1(B)).

The laser luminous flux outputted from the semiconductor laser light source 11b so as to reach the reflecting mirror 211a will now be explained. This laser luminous flux is fed onto the third floor of the layered structure, and travels a reflecting prism 301, a beam splitter 302, a reflecting prism 303, and a reflecting prism 304, so as to reach a reflecting prism 213 on the second floor of the layered structure. Thereafter, on the second floor of the layered structure, the luminous flux reaches the reflecting mirror 211a by way of a reflecting prism 214 and a concave lens 212a (see Table 1(C)).

The laser luminous flux outputted from the semiconductor laser light source 11b so as to reach the reflecting mirror 211b will now be explained. This laser luminous flux is fed onto the third floor of the layered structure, reaches the beam splitter 302 by way of the reflecting prism 301, and is reflected by the beam splitter 302. Thus reflected luminous flux reaches a reflecting prism 215 on the second floor of the layered structure by way of a reflecting prism 305. Thereafter, on the second floor of the layered structure, the luminous flux reaches the reflecting mirror 211b by way of a reflecting prism 216 and a concave lens 212b (see Table 1(D)).

In this embodiment, as mentioned above, the PZT device 410, 420 is disposed in one of the optical paths of two laser luminous fluxes in each system.

Namely, the PZT device 410 is disposed in the optical path directed to the reflecting mirror 201b in the two optical paths from the semiconductor laser light source 11a, whereas the PZT device 420 is disposed in the optical path directed to the reflecting mirror 211a in the two optical paths from the semiconductor laser light source 11b.

The PZT devices 410, 420 change the optical path length of one of the interferometer optical paths, so as to carry out phase shifting operations in order to introduce time carrier components.

The PZT devices 410, 420, CCD camera 3, and semiconductor laser light sources (LDs) 11a, 11b are regulated by a timing control device (controller) 5. Image data of interference speckle patterns captured by the CCD camera 3 are stored into a memory within the power/memory device 4. The computer 6 subjects the image data to phase analyzing processing using phase shifting, thereby obtaining information items such as the amount of distortion in deformation of the object. Thus obtained information items concerning the object are displayed by the display unit (monitor) 7.

The interference speckle pattern image capturing timings in a cycle of phase shifting operation are contrived so as to overlap each other in vertical and horizontal directions. Namely, as shown in FIGS. 5C, 5D, 5E, and 5F, the timings are synchronized such that four images are captured in each of the vertical and horizontal directions, and the semiconductor laser light sources 11a and 11b are alternately driven (see FIGS. 5C and 5D) in synchronization with rising timings of the camera output signal (V-sync; see FIG. 5B). As a consequence, the vertical and horizontal interference speckle patterns can be analyzed according to image data acquired in periods overlapping each other, whereby a higher analyzing accuracy can be attained with no shifts in the temporal axis when totally studying the vertical and horizontal image data in comparison with each other. For improving the reliability in data analysis, it is preferred that images for vertical analysis and images for horizontal analysis be captured alternately not only in image capturing in phase shifting operations but in general.

In particular, the apparatus in accordance with the present invention is effective for measuring deformations when carrying out a tensile test (or fatigue test) of a material, for example. In general, when a material such as an aluminum alloy is pulled, a uniform elongation occurs in an elastic deformation area, whereas the elongation is not uniform in a plastic deformation area. When this phenomenon is observed by speckle interferometry (ESPI), it can be seen that intervals of lateral fringes greatly change with time as shown in FIGS. 6A to 6E. Thereafter, the phase distribution will be analyzed according to the image data.

Figure 7A:
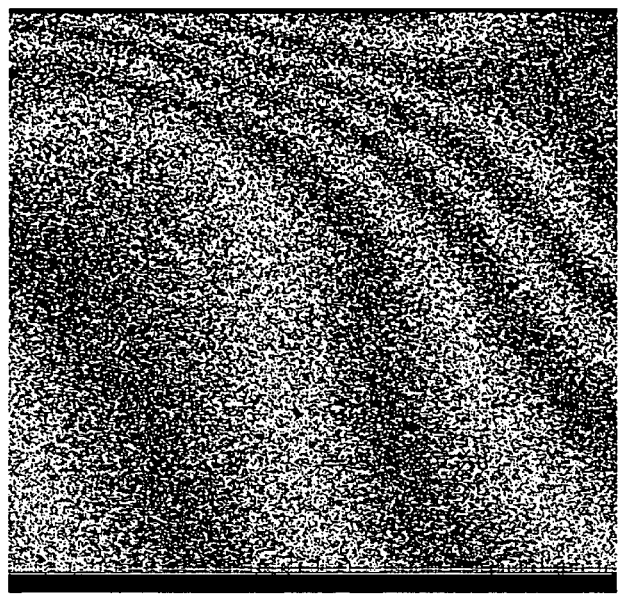
Figure 7B:
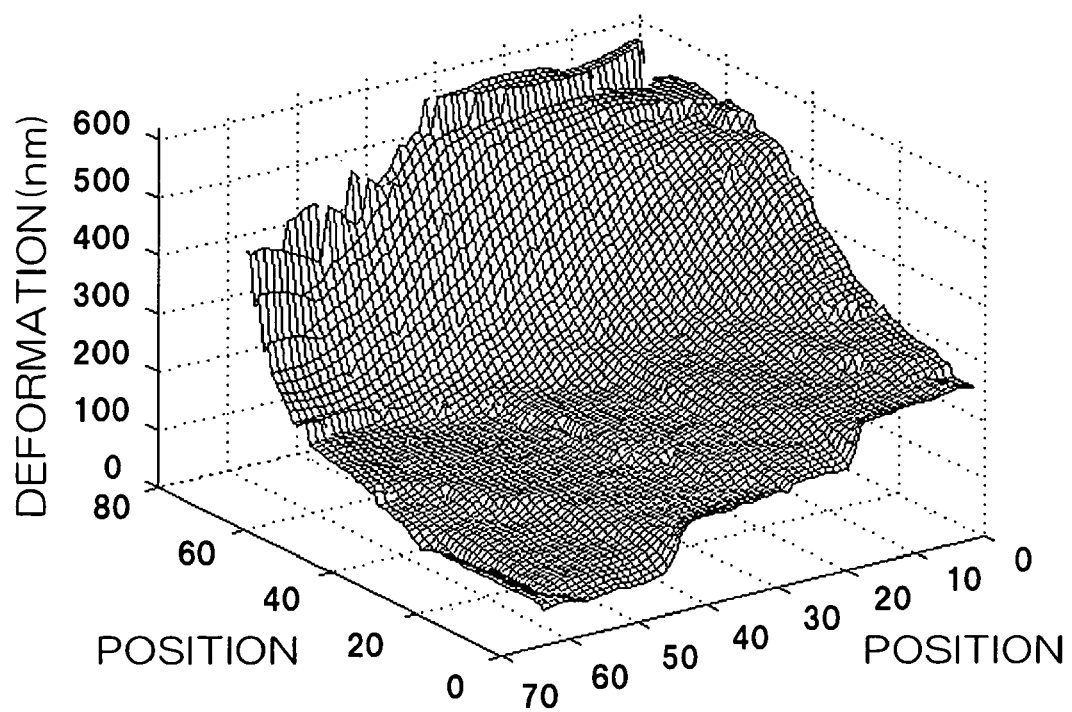
FIG. 7B is a chart showing a three-dimensional form distribution obtained according to this image.
Figure 8:
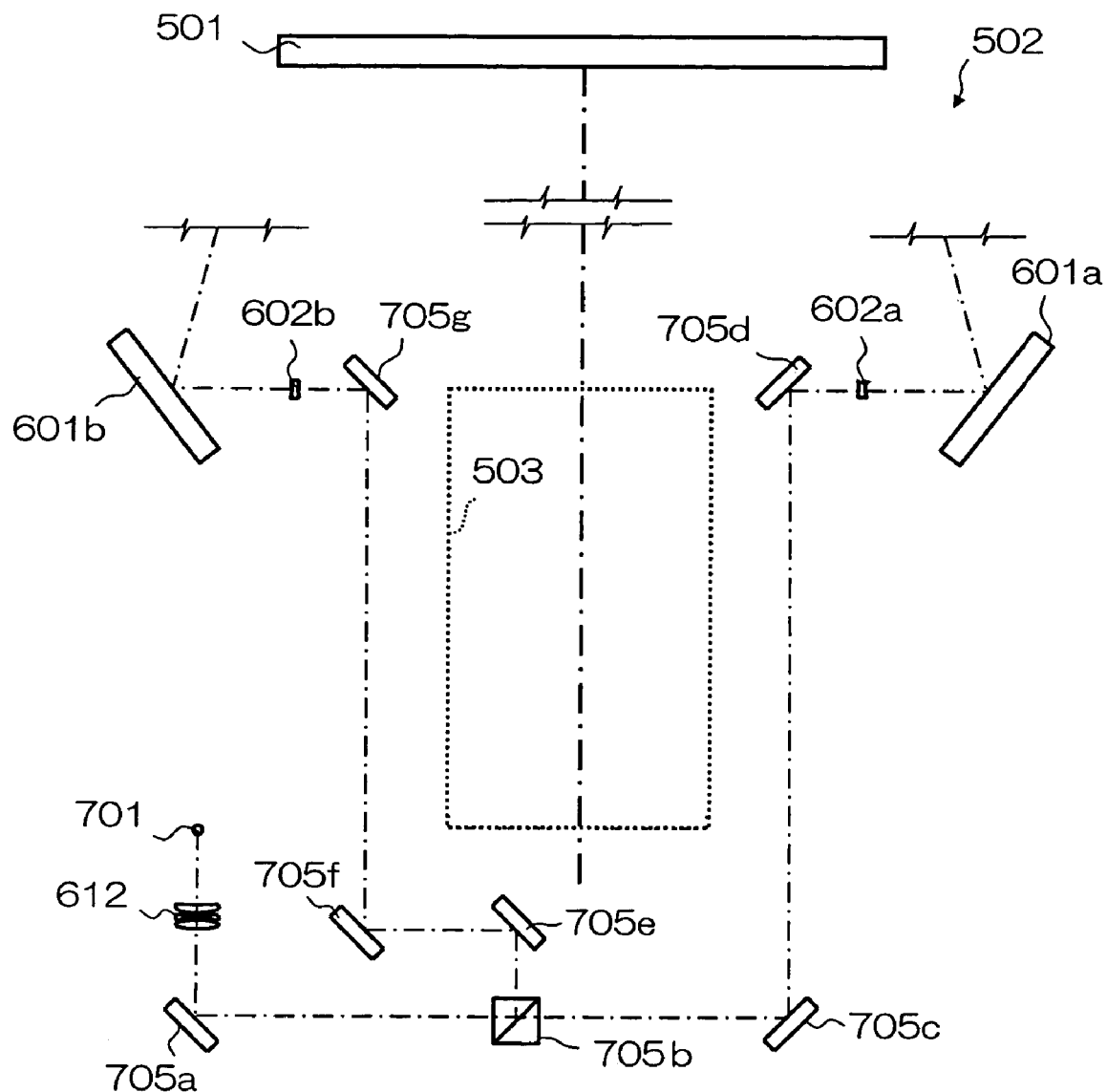
FIG. 8 is a schematic view showing a conventional speckle interferometer apparatus of dual luminous flux irradiation type.

In the apparatus in accordance with this embodiment, the three-dimensional form distribution shown in FIG. 7B is obtained according to the interference speckle image data shown in FIG. 7A, for example.

Modification of Embodiment

The speckle interferometer apparatus in accordance with the present invention can be modified in various manners. For example, a transparent plate may be disposed in place of the through hole 14 in the optical member mounting plate 10.

The light-transmitting area in the apparatus of the present invention may be any area as long as interference light can reach the imaging device therethrough. This area may be formed from a transparent glass sheet or plastic sheet. The optical member mounting device as a whole may be formed from a transparent member as well.

Without being restricted to the apparatus for analyzing interference speckle patterns in two directions as in the above-mentioned embodiment, the apparatus may analyze unidirectional interference speckle patterns, or interference speckle patterns in three directions within the same plane.

The arrangement of optical members on the optical member mounting device is not limited to that in the above-mentioned embodiment, but various other arrangements are employable. The layered structure is not limited to the three-floor structure, but may be composed of two floors or four or more floors.

The present invention is applicable to dynamic objects in general. For example, it is not only applicable to fatigue tests of materials including items of the above-mentioned tensile test in general, but also to minute dynamic changes in constituent parts of animals and plants, human tissues in particular.

In the speckle interferometer apparatus in accordance with the present invention, as explained in detail in the foregoing, an optical member mounting device mounted with optical members including a pair of luminous flux outputting devices is disposed on the object side of the main unit of the imaging device while being separated from the imaging device, and an area located between the pair of luminous flux outputting devices in the optical member mounting device is a light-transmitting area. Therefore, the traveling of optical paths can be minimized, so as to make the apparatus compact, while attaining a favorable measuring accuracy, and image pickup cameras can be exchanged easily.

TABLE 1

(A)
LD11a ⇒ 101 (1F) ⇒ 201a
3F
2F  |203| → 204 → 202a → 201a
1F 101 → 102 → |103|

(B)
LD11a ⇒ 101 (1F) ⇒ 201b
3F
2F  |205| → 206 → 202b → 201b
1F 101 → 102 → 104 → |105|

(C)
LD11b ⇒ 301 (3F) ⇒ 211a
3F 301 → 302 → 303 → 304
2F  213 → 214 → 212a → 211a
1F (D)
LD11b ⇒ 301 (3F) ⇒ 211b
3F 301 → 302 → |305|
2F  |215| → 216 → 212b → 211b
1F

What is claimed is:

1. A speckle interferometer apparatus for dividing a luminous flux from a light source into two luminous fluxes, irradiating a rough object surface acting as a surface to be measured with the two luminous fluxes, causing respective reflected luminous fluxes of the two luminous fluxes from the rough object surface to interfere with each other, and capturing an image of an interference speckle pattern formed by the interference;

the apparatus comprising:
a luminous flux dividing device which divides the luminous flux from the light source into the two luminous fluxes;
two luminous flux outputting devices which outputs the respective divided luminous fluxes toward the rough object surface; and
an optical member mounting, which mounts the luminous flux dividing device and luminous flux outputting devices is disposed on the rough object surface side of a main unit of an imaging device which captures the image of the interference speckle pattern while being separated from the imaging device,
wherein a predetermined area of the optical member mounting located between the two luminous flux outputting devices is a light-transmitting area which transmits therethrough interference light from the rough object surface.

2. A speckle interferometer apparatus according to claim 1, wherein the optical member mounting is mounted with an optical path length difference providing device which provides a predetermined optical path length difference between optical paths of the two luminous fluxes divided by the luminous flux dividing device.

3. A speckle interferometer apparatus according to claim 1, wherein the optical member mounting is formed as a plate.

4. A speckle interferometer apparatus according to claim 1, wherein the two luminous flux outputting devices are substantially disposed so as to oppose each other across the light-transmitting area in a predetermined direction.

5. A speckle interferometer apparatus according to claim 1, comprising two sets each of the two luminous flux outputting devices, the respective predetermined directions of the two luminous flux outputting devices in the two sets being substantially orthogonal to each other.

6. A speckle interferometer apparatus according to claim 5, wherein two sets of the two luminous flux outputting devices are regulated such that one group can output the luminous flux alone or such that the two sets can alternately output the luminous fluxes.

7. A speckle interferometer apparatus according to claim 1, wherein the light-transmitting area is a through hole formed in the optical member mounting.

8. A speckle interferometer apparatus according to claim 1, wherein the light-transmitting area is a transparent plate constituting at least a part of the optical member mounting.

9. A speckle interferometer apparatus according to claim 1, wherein an optical member mounted on the optical member mounting has a layered structure near the light-transmitting area.

10. A speckle interferometer apparatus according to claim 9, wherein the layered structure comprises three floors.

* * * * *